(12) United States Patent
Bhattacharjee et al.

(10) Patent No.: US 8,694,573 B2
(45) Date of Patent: Apr. 8, 2014

(54) METHOD AND SYSTEM FOR DETERMINING A QUOTIENT VALUE

(75) Inventors: Debotosh Bhattacharjee, Kolkata (IN); Santanu Halder, West Bengal (IN)

(73) Assignee: Jadavpur University, Kolkata (IN)

( * ) Notice: Subject to any disclaimer, the term of this patent is extended or adjusted under 35 U.S.C. 154(b) by 1109 days.

(21) Appl. No.: 12/647,255

(22) Filed: Dec. 24, 2009

(65) Prior Publication Data

US 2011/0099217 A1    Apr. 28, 2011

(30) Foreign Application Priority Data

Oct. 26, 2009 (IN) .......................... 1275/KOL/2009

(51) Int. Cl.
| | | |
|---|---|---|
| G06F 7/52 | (2006.01) | |
| G06G 7/16 | (2006.01) | |
| H04N 9/083 | (2006.01) | |
| H04N 9/74 | (2006.01) | |
| H04N 5/00 | (2011.01) | |
| H05G 1/64 | (2006.01) | |

(52) U.S. Cl.
USPC ........... 708/654; 708/620; 708/631; 708/650; 708/653; 708/844; 348/273; 348/586; 348/607; 378/98.7

(58) Field of Classification Search
USPC ................. 708/627, 631, 653–654, 844, 650; 348/607, 273, 586; 378/98.7; 382/103, 382/260
See application file for complete search history.

(56) References Cited

U.S. PATENT DOCUMENTS 3,777,132 A  * 12/1973 Bennett, Jr. ................... 708/654
4,686,647 A  *  8/1987 Soffer et al. .................. 708/844
5,249,149 A      9/1993 Cocanougher et al.
5,778,044 A  *  7/1998 Bruijns ........................ 378/98.7
6,052,706 A  *  4/2000 Wheeler et al. ............... 708/631
6,061,100 A  *  5/2000 Ward et al. .................... 348/607
6,598,065 B1 *  7/2003 Harrison ....................... 708/654
6,753,929 B1 *  6/2004 Sheraizin et al. ............. 348/586
6,996,287 B1 *  2/2006 Weiss ............................ 382/260
7,203,337 B2 *  4/2007 Heyden ........................ 382/103
7,321,916 B2     1/2008 Harrison et al.
7,479,998 B2 *  1/2009 Mitsunaga et al. ........... 348/273
8,019,805 B1 *  9/2011 Sarma ........................... 708/627

(Continued)

FOREIGN PATENT DOCUMENTS

CA        2453712        6/2005

OTHER PUBLICATIONS

Wilson, Andrew. "FPOAS Speed Flat-Filed Correction." Vision Systems Design. May 11, 2006. URL at http://www.vision-systems.com/articles/print/volume-11/issue-5/technology-trends/image-processing/fpoas-speed-flat-field-correction.html.*

(Continued)

*Primary Examiner* — Farley Abad
*Assistant Examiner* — Henry Yu
(74) *Attorney, Agent, or Firm* — Brundidge & Stanger, P.C.

(57) ABSTRACT

A method for determining a quotient value from a dividend value and a divisor value in a digital processing circuit is provided. The method includes computing a reciprocal value of the divisor value and multiplying the reciprocal value by the dividend value to obtain a reciprocal product, the reciprocal product having an integer part. The method also includes computing an intermediate remainder value by computing a product of the integer part and the divisor value, and subtracting the resulting product from the dividend value and determining the quotient value based upon the intermediate remainder value.

26 Claims, 6 Drawing Sheets

(56) References Cited

U.S. PATENT DOCUMENTS

| | | | |
|---|---|---|---|
| 8,255,448 B1* | 8/2012 | Langhammer | 708/653 |
| 2003/0147530 A1* | 8/2003 | Amano et al. | 380/30 |
| 2005/0027775 A1* | 2/2005 | Harrison et al. | 708/650 |

OTHER PUBLICATIONS

International Search Report and Written Opinion prepared by the Australian Patent Office in PCT/IB2010/002651, mailed Apr. 12, 2011.

Fowler, et al., "An Accurate High Speed Implementation of Division by Reciprocal Approximation", Proc. 9th IEEE Symp. Comput. Arithmetic, 1989, pp. 60-67.

Oberman, "Divisonal Algorithms and Implentations", IEEE Transactions on Computers, vol. 46, No. 8, Aug. 1997, pp. 833-854.

Irwin, "CES 575, Computer Arithmetic", www.cse.psu.edu/~mji, Spring 2003.

Chiang, J., et al., "Carry-Free Radix-2 Subtractive Division Algorithm and Implementation of the Divider," Tamkang Journal of Science and Engineering, 2000, vol. 3, No. 4. pp. 249-255.

Ercegovac, M., et al., "Digital Arithmetic," Computer Science Department, University of California Los Angeles and Department of Electrical and Computer Engineering University of California at Irvine, Viewgraph Copyright 2003, Elsevier Science 2004, Morgan-Kauffman publishers 2004, pp. 1-27, http://www.cs.ucla.edu/digital_arithmetic/files/.

Flynn, M. J., "EE 486 Lecture 10: Multiply Iteration and an Introduction to Divide," Computer Architecture and Arithmetic Group, Stanford University, http://www.uspto.gov/patft/index.html.

Harris, D. L., et al., "SRT Division Architectures and Implementations," Proceedings of the 13th Symposium on Computer Arithmetic (ARITH '97), Computer Systems Laboratory, Stanford University, 1997, pp. 1-8.

Joye, M., et al., "A Protected Division Algorithm," Published in P. Honeyman, Ed., Fifth Smart Card Research and Advanced Application Conference (CARDIS'02), Usenix Association, 2002, pp. 69-74, http://www.geocities.com/MardJoye/ http://www.gemplus.com/smart/.

Kwon, T., et al., "A 0.8µm Implementation of a Floating Point Unit for a Processing-in-Memory System," USC Information Science Institute 4676 Admiralty Way, Marina Del Rey, CA 90292, U.S.A., ISCAS 2004, pp. II-453-II-456.

Modeltech International [online], 2006 [retrieved on Jul. 29, 2010]. Retrieved from the Internet:< URL: http://www.modeltech.com>.

Perry, D. L., "VHDL: Programming by Example," Fourth Edition, Tata McGraw-Hill Edition, Copyright 2002 by the Tata McGraw-Hill Companies, Inc., pp. 1-497.

Schulte, M. J., et al., "High Speed Reciprocal Approximations," Department of Electrical Engineering and Computer Science, Lehigh University, Bethlehem, PA, USA, 1998, pp. 1-5.

FPGA and CPLD Solutions from Xilinx, Inc.—Flash Player Installation [online], 2010 [retrieved on Jul. 29, 2010]. Retrieved from the Internet: < URL: http:www.xilinx.com>.

* cited by examiner

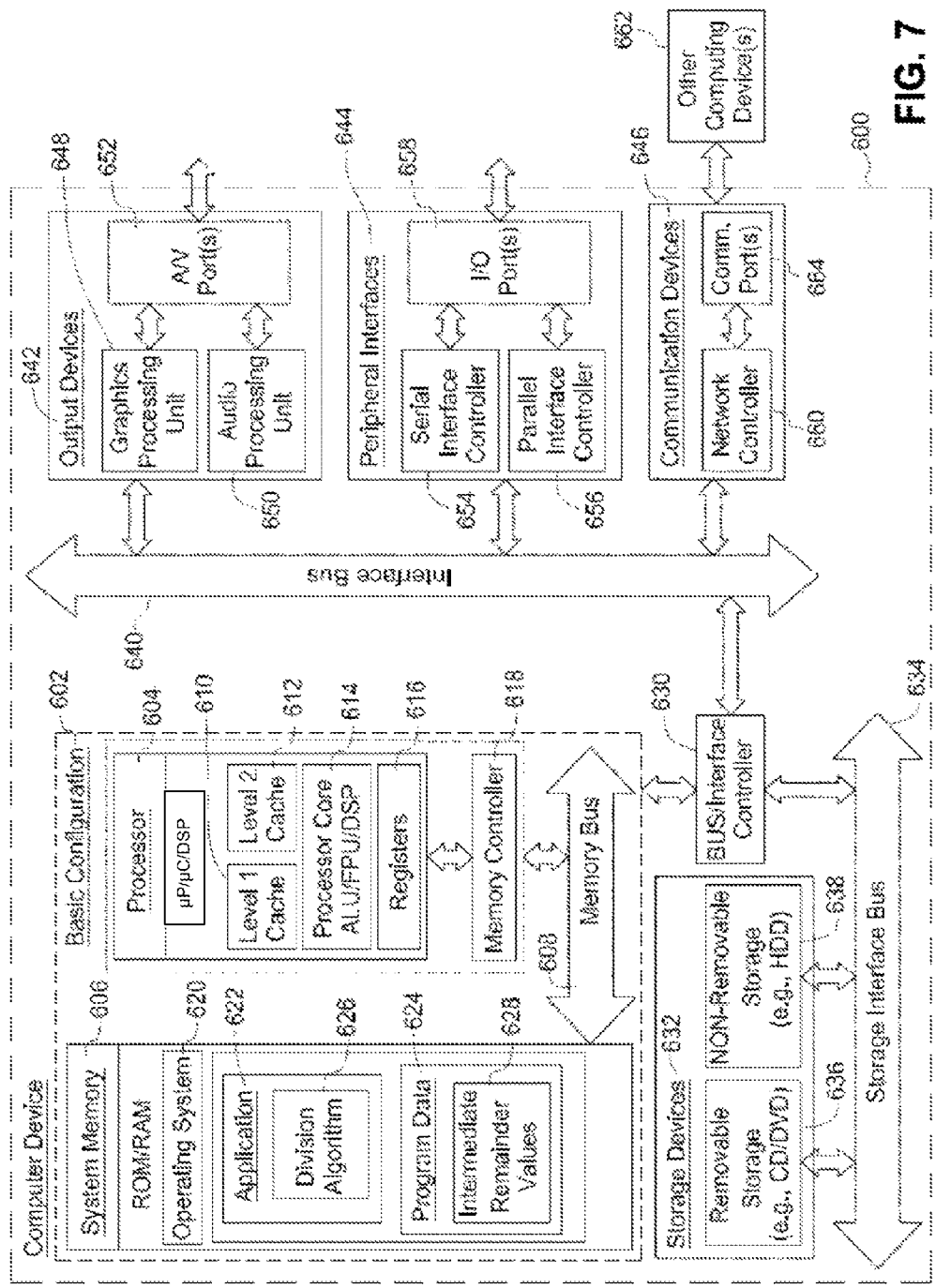

METHOD AND SYSTEM FOR DETERMINING A QUOTIENT VALUE

CROSS-REFERENCE TO RELATED APPLICATION

The present application claims priority under 35 U.S.C. §119 to a corresponding patent application filed in India and having application number 1275/KOL/2009, filed on Oct. 26, 2009, the entire contents of which are herein incorporated by reference.

BACKGROUND

In many applications, such as image processing applications, it is often required to perform several preprocessing algorithms to an image prior to applying high level processing algorithms such as edge detection and feature detection. The preprocessing steps usually include filtering or noise reduction, to suitably condition the image for more complex processing algorithms. One such preprocessing step includes division operations. Division operations are among the most widely used arithmetical operations in many computational applications. A variety of division methods and algorithms are known and are in use. For example, methods such as the digit recurrence method, the multiplicative method, the Cordie and continued product method, the subtractive method, and the table look up method may be employed to perform division operations. However, such methods have relatively high latency time that depends on length of input operands.

Another technique for performing the division operation is the reciprocal approximation method. The reciprocal approximation method has reduced latency time, but does not provide accurate results, which is not acceptable in certain real time applications.

SUMMARY

Briefly, in accordance with one aspect, a method for determining a quotient value from a dividend value and a divisor value in a digital processing circuit is provided. The method includes computing a reciprocal value of the divisor value and multiplying the reciprocal value by the dividend value to obtain a reciprocal product, the reciprocal product having an integer part. The method also includes computing an intermediate remainder value by computing a product of the integer part and the divisor value, and subtracting the resulting product from the dividend value and determining the quotient value based upon the intermediate remainder value.

In accordance with another aspect, a method for determining a quotient value Q from a dividend value D and a divisor value d in a digital processing circuit is provided. The method includes computing a reciprocal value 1/d of the divisor value d and multiplying the reciprocal value 1/d by the dividend value D to obtain a reciprocal product RP of the form X.YYY, where X is an integer part of the reciprocal product RP. The method also includes computing an intermediate remainder value R in accordance with the relationship: $R=D-(X*d)$ and if the intermediate remainder value R is not equal to the divisor value d or to zero, computing the quotient value Q in accordance with the relationship $Q=X+(R*1/d)$.

In accordance with another aspect, a system for determining a quotient value Q from a dividend value D and a divisor value d is provided. The system includes a memory circuit for storing the quotient value Q, the dividend value D, and the divisor value d. The system also includes a processing circuitry configured to estimate a reciprocal product RP by multiplying the dividend value D and a reciprocal value 1/d of the divisor value d, to compute an intermediate remainder value R by computing a product of an integer part X of the reciprocal product RP and the divisor value d, and subtracting the resulting product from the dividend value D and to determine the quotient value Q based upon the intermediate remainder value R.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 is a block diagram illustrating an example computing device that is arranged for determining a quotient value from a dividend value and a divisor value.

DETAILED DESCRIPTION

Figure 1:
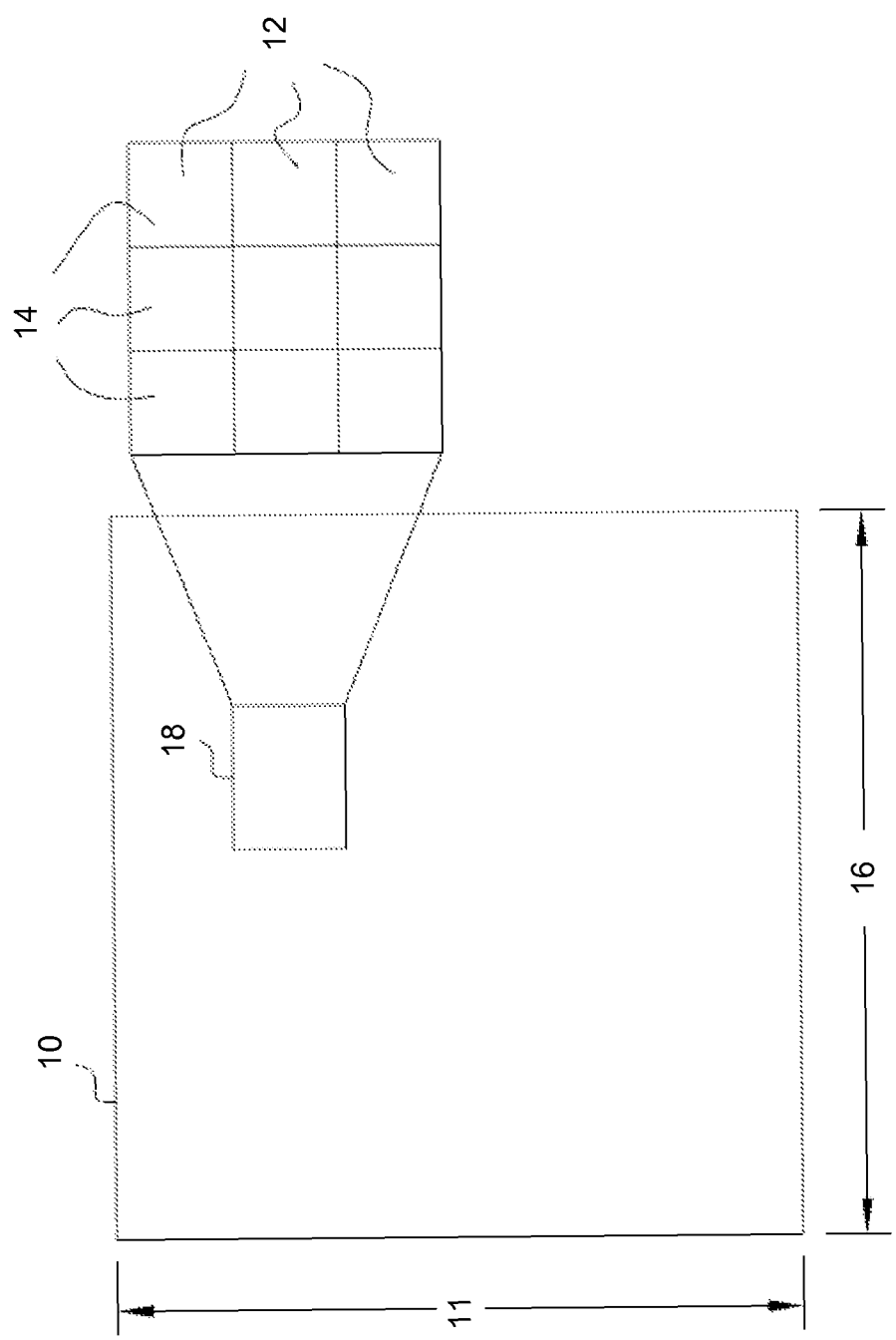
FIG. 1 is an illustrative embodiment of an image.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to division of signed or unsigned operands. Such techniques may be useful in digital processing circuits such as employed in a variety of applications like image processing, signal processing and linear approximation applications that require efficient, reliable and accurate results with reduced latency time.

Referring now to FIG. 1, an example discrete pixel image 10 produced via an imaging system (not shown) is shown. Image 10 is composed of a matrix of discrete pixels 18 disposed adjacent to one another in a series of rows and columns. In processing of image data, it may be useful to apply various filtering techniques that may consider two or more pixels in a row, column or area. For example, pixels in rows 12 and columns 14 may be filtered by determining a median value of the group, such as the 9 pixels in rows 12 and columns 14.

Over all, these rows and columns of pixels provide a pre-established matrix width 16 and matrix height 11. Typical matrix dimensions may include 256×256 pixels; 512.×512 pixels; 1024×1024 pixels and so forth. The filtering techniques, including those that determine median values in a group of pixels, may be applied by moving the filter grouping around the matrix and considering different groups of pixels with each move.

Each pixel includes information that is representative of a portion of the imaged object. The information is present in the form of intensity values. The intensity value for each pixel has a dynamic range, typically characterized in terms of a binary number, such as of 8 bits, 16 bits, and so forth. By using the pixel information, an image of the object may be reconstructed using several image processing techniques.

Division of signed or unsigned operands is a preprocessing step that is performed during image processing. The example methods and systems described herein enable accurate estimation of a quotient value from a divisor value and a dividend value. The methods and systems discussed herein utilize an efficient, reliable, and cost-effective technique for performing division operation while reducing a latency time of such operations. The technique described above can be utilized for a variety of applications such as linear interpolation and linear approximation that require division of two signed or unsigned operands.

As one example, an operand can be used to filter an image to select pixels above a threshold, equal to a constant, or within a range; to compare or combine two images; to perform multiplication, division, or threshold convolution; or, more generally, to perform any image processing operation involving data driven branching.

As another example, methods described below may be used to perform binary division of pixel intensity values.

As yet another example, median filtering is a preprocessing step that is performed during image processing. The filtering technique includes finding a median value for a set of pixels with varying intensity values. The manner in which the median value and method for division of signed or unsigned operands are computed is described below.

For more information regarding the manner in which the median value is calculated, the reader is referred to U.S. patent application Ser. No. 12/646,681, filed on Dec. 23, 2009, entitled "System and Method to Identify a Median Value," the entirety of which is herein incorporated by reference.

Figure 2:
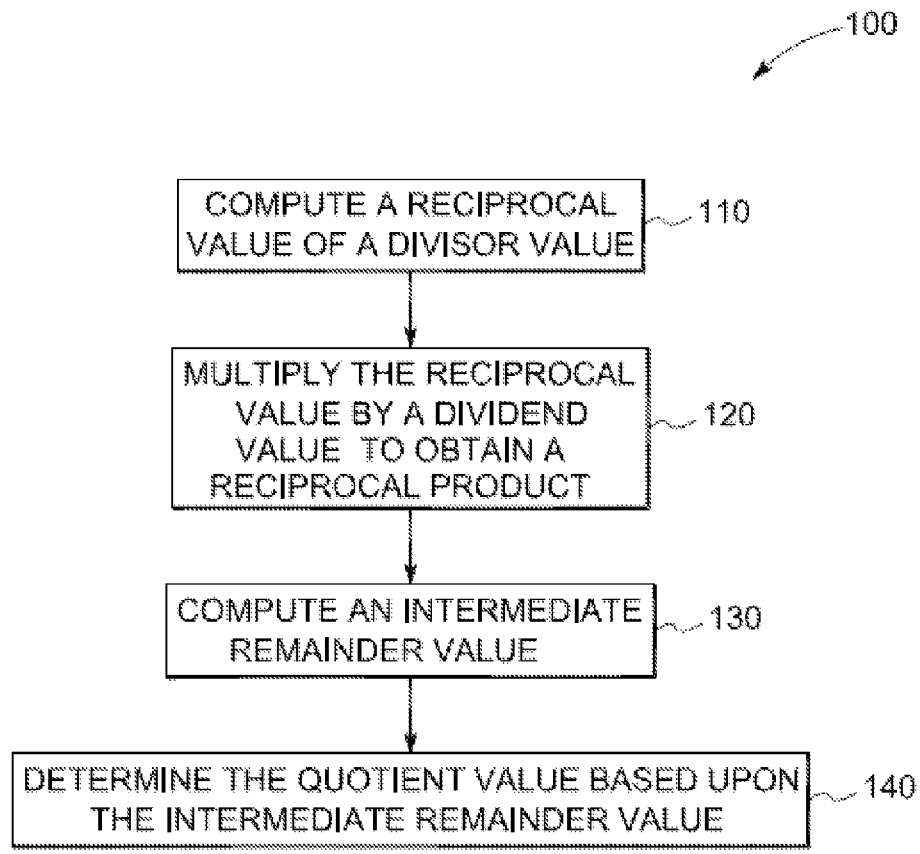
FIG. 2 is an example flow diagram of an embodiment of a method for determining a quotient value from a dividend value and a divisor value.

Turning to FIG. 2, an example flow diagram 100 of an embodiment of a method for determining a quotient value from a dividend value and a divisor value is illustrated. The method includes computing a reciprocal value of the divisor value, as represented by block 110. At block 120, the reciprocal value is multiplied by the dividend value to obtain a reciprocal product. In this example embodiment, the reciprocal product includes an integer part and a fraction part. In certain embodiments, reciprocal values for a plurality of divisor values may be pre-computed and stored in a look up table, particularly where only certain divisor values are anticipated, such as integer values within a given range (e.g., binary values corresponding to base 10 values between 0 and 256). Further, such computed and stored reciprocal values may be accessed from the look up table during the multiplying step.

At block 130, an intermediate remainder value is computed. In this embodiment, the intermediate remainder value is computed by computing a product of the integer part of the reciprocal product and the divisor value and subtracting the resulting product from the dividend value. Further, at block 140, the quotient value is determined based upon the computed intermediate remainder value.

In one embodiment, if the intermediate remainder value is equal to the divisor value, the quotient value is set to the sum of the integer part and unity. In another embodiment, if the intermediate remainder value is zero, the quotient value is set to the dividend value. In yet another embodiment, if the intermediate remainder value is not equal to the divisor value or to zero, the quotient value is determined by computing a product of the intermediate remainder and the reciprocal value, and adding the resulting product to the integer part. Thus, the quotient value is determined based upon the intermediate remainder value as described above.

Figure 3:
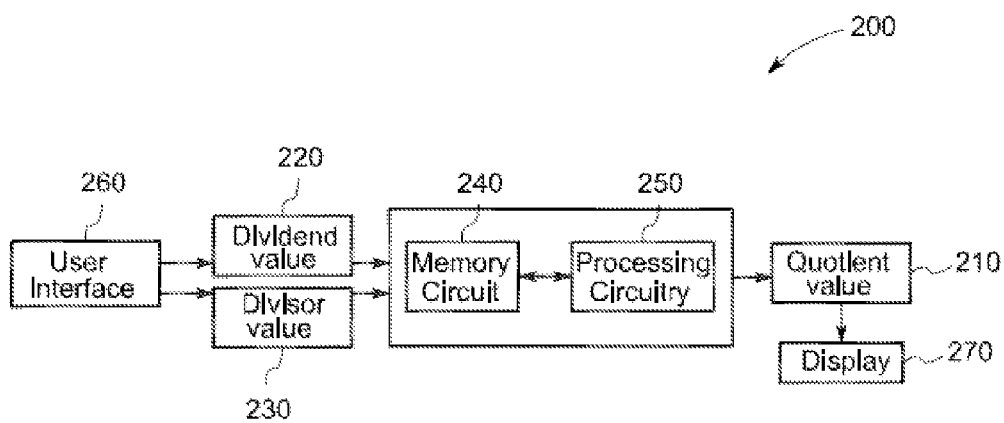
FIG. 3 is a schematic diagram of a system for determining a quotient value Q from a dividend value D and a divisor value d.

FIG. 3 is a schematic diagram of a system 200 for determining a quotient value Q 210 from a dividend value D 220 and a divisor value d 230. As illustrated, the system 200 includes a memory circuit 240 for storing the quotient value Q 210, the dividend value D 220 and the divisor value d 230. The memory circuit 240 may include hard disk drives, optical drives, tape drives, random access memory (RAM), read-only memory (ROM), programmable read-only memory (PROM), Redundant Arrays of Independent Disks (RAID), flash memory, magneto-optical memory, holographic memory, bubble memory, magnetic drum, memory stick, Mylar® tape, smartdisk, thin film memory, zip drive, and so forth. Further, the system 200 includes a processing circuitry 250 configured to compute an intermediate remainder value R from the dividend value D 220 and the divisor value d 230 and to determine the quotient value Q 210 based upon the intermediate remainder value R.

Further, the system 200 may include a variety of software and hardware for determining the quotient value Q 210. For example, the system 200 may include file servers, application servers, web servers, disk servers, database servers, transaction servers, telnet servers, proxy servers, list servers, groupware servers, File Transfer Protocol (FTP) servers, audio/video servers, LAN servers, DNS servers, firewalls, and so forth. The system 200 also includes a user interface 260 that enables users, system administrators and computer programmers to communicate with the memory circuit 240 and the processing circuitry 250. For example, the user interface 260 may be utilized by a user to provide input dividend D and divisor d values 220 and 230 to the processing circuitry 250. Moreover, the system 200 includes a display 270 to display the output quotient value Q 210 from the processing circuitry 250.

Figure 4:
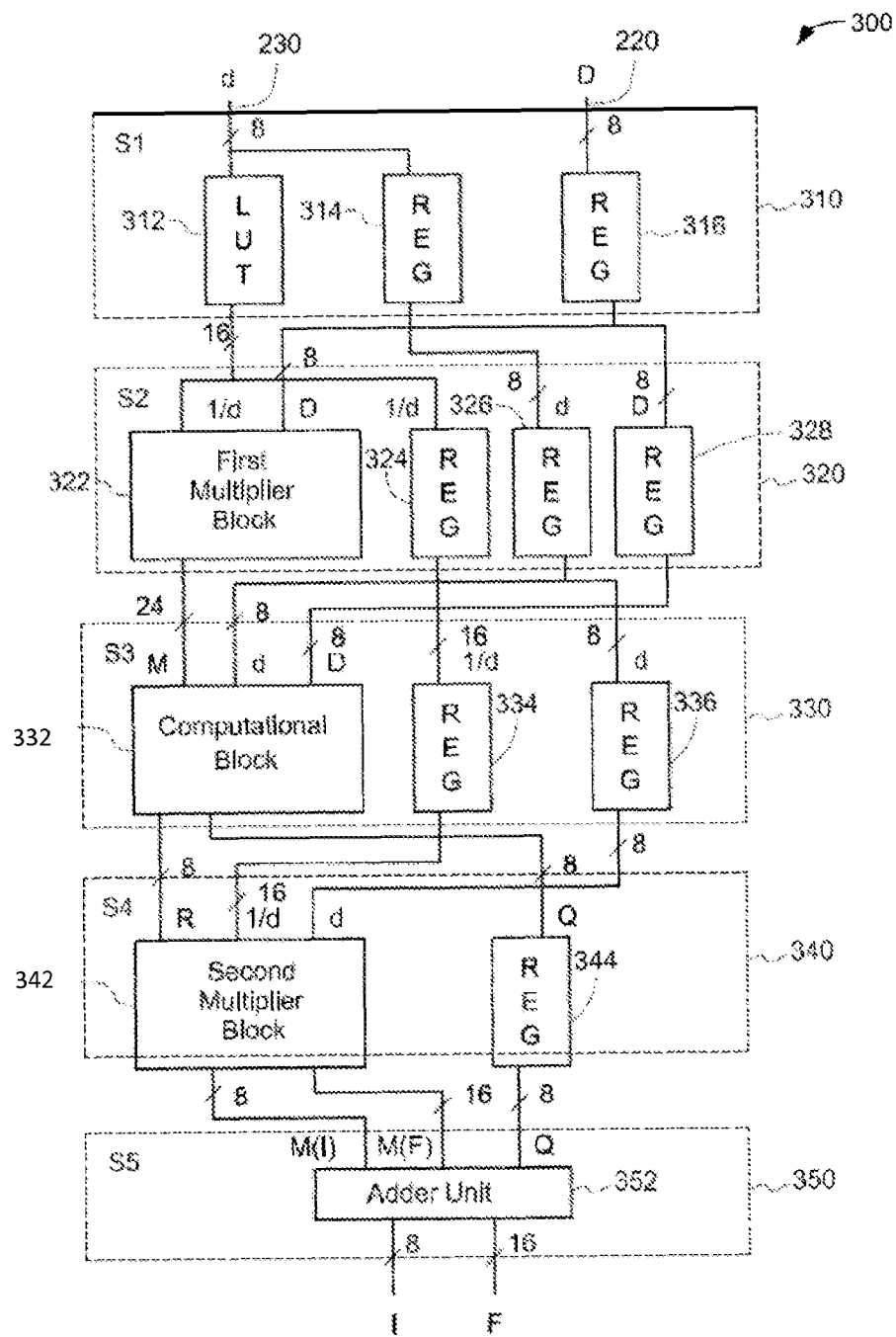
FIG. 4 is example architecture for the processing circuitry of FIG. 3.

FIG. 4 illustrates an example architecture 300 for the processing circuitry 250 of FIG. 3. As illustrated, the processing circuitry 300 includes a variety of components disposed in a plurality of component stages, such as represented by reference numerals 310, 320, 330, 340 and 350. In the illustrated embodiment, the component stage 310 includes a look up table 312 which is configured to receive 8-bit divisor value d 230 and to access stored reciprocal values to determine the reciprocal value 1/d of the divisor value d 230 in 16 bits.

It should be noted that the use of the look up table 312 facilitates reduction in time for computing the reciprocal value of the divisor value d 230. However, in certain embodiments, the reciprocal value 1/d may be computed from the divisor value d 230 in the component stage 310. The component stage 310 also includes two 8-bit registers 314 and 316 for propagating the divisor d 230 and the dividend value D 220 to the component stage 320. In this embodiment, the latency time of the look up table 312 is about one clock cycle.

The component stage 320 includes a first multiplier block 322 configured to multiply the dividend value D 220 and the reciprocal value 1/d to obtain a reciprocal product RP. In the illustrated embodiment, the component stage 320 includes a 16-bit register 324 and two 8-bit registers 326 and 328 to propagate the reciprocal value 1/d, the divisor value d 230 and the dividend value D 220 to the component stage 330. In this example, the reciprocal product RP is of the form X.YYY, where X is an integer part of the reciprocal product RP. The first multiplier block 322 also has a latency of about one clock cycle.

Further, the component stage 330 includes a computational block 332 configured to estimate an intermediate remainder value R in accordance with the following relationship:

$$R = D - (X * d) \quad (1)$$

The component stage 330 also includes a 16-bit register 334 and an 8-bit register 336 to propagate the reciprocal value 1/d and the divisor value d to the component stage 340. The computational block 332 estimates the intermediate remainder value R from one 24-bit value and two 8-bit values from the component stage 320. Again, the computational block 332 also has a latency time of about one clock cycle.

In this embodiment, the component stage 340 includes a second multiplier block 342 to determine the quotient value Q 210 based upon the intermediate remainder value R. The second multiplier block 342 takes one 16-bit value and two 8-bit values from the component stage 330 and multiplies them to determine the quotient value Q 210 considering a plurality of different cases described below. In particular, the second multiplier block 342 determines multipliers based upon the intermediate remainder value and propagates such multipliers to the component stage 350 for determining the output quotient value Q 210. The component stage 340 also includes another 8-bit register 344 for propagating the quotient value Q 210 to the component stage 350.

The component stage 350 includes an adder unit 352 that takes two 8-bit values that are output from the second multiplier block 342 a and one 16-bit value to determine the output quotient value Q 210. In one embodiment, if the intermediate remainder value R is equal to the divisor value d, the quotient value Q is set to the sum of the integer part X and unity, as described by the following relationship:

$$\text{IF } d = R \text{ THEN } Q = (X+1) \quad (2)$$

In another embodiment, if the intermediate remainder value R is zero, the quotient value Q is set to the dividend value D, as represented by the following relationship:

$$\text{IF } R = 0 \text{ THEN } Q = D \quad (3)$$

In yet another embodiment, if the intermediate remainder value R is not equal to the divisor value d or to zero, the quotient value Q is determined by computing a product of the intermediate remainder RP and the reciprocal value 1/d, and adding the resulting product to the integer part X, as represented by the following relationship:

$$Q = X + \left(R * \frac{1}{d}\right) \quad (4)$$

It should be noted that the operation of the blocks in each of the component stages 310, 320, 330, 340 and 350 is controlled by a global clock (not shown). In one example embodiment, the various steps performed by the component stages 310, 320, 330, 340 and 350 are achieved through five-stage pipeline architecture. Thus, in the architecture illustrated in FIG. 4, the modules in each of the component stages 310, 320, 330, 340 and 350 take one clock cycle and can execute in parallel.

Figure 5:
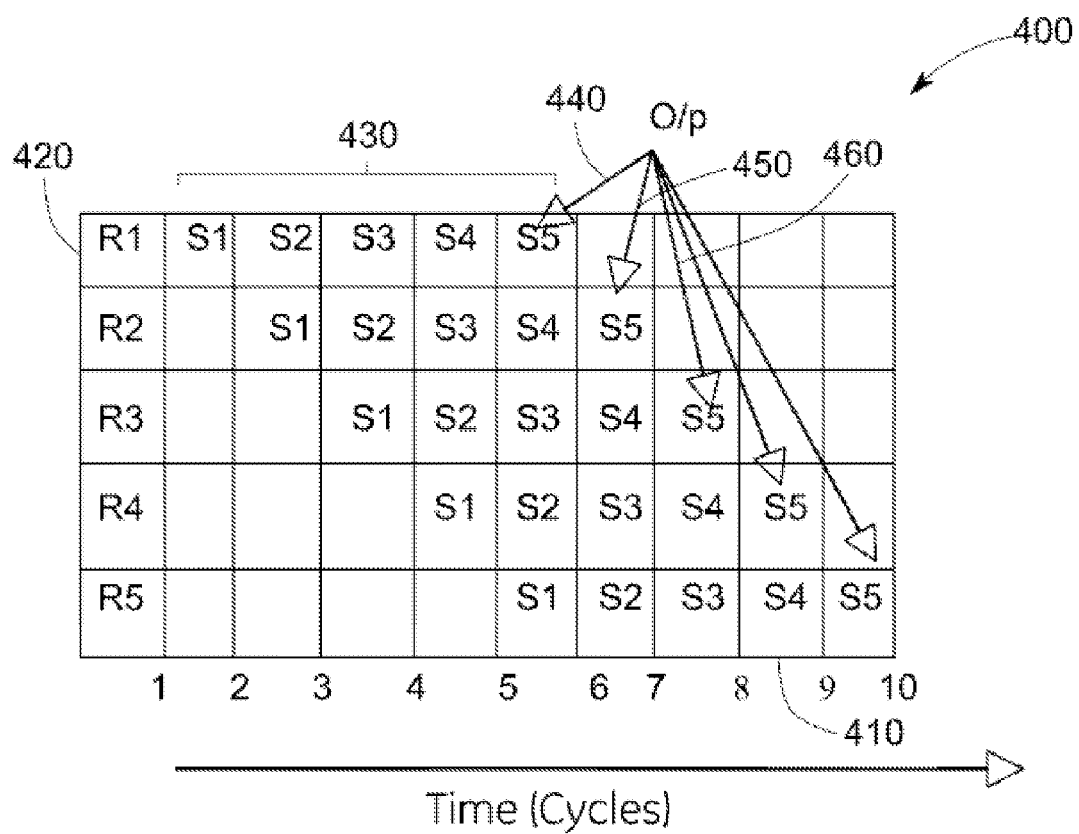
FIG. 5 is an example space-time diagram of a five-stage pipeline for the architecture of FIG. 4.

FIG. 5 illustrates an example space-time diagram 400 of a five-stage pipeline for the architecture 300 of FIG. 4. The abscissa axis 410 represents the time measured in clock cycles and the ordinate axis 420 represents rounds of estimating the quotient values by performing the division operation. As represented by reference numeral 430, the first output 440 can be calculated after five clock cycles where the pipeline processes a sequence of tasks represented by S1, S2, S3, S4 and S5 performed by the component stages 310, 320, 330, 340 and 350 (shown in FIG. 3). However, subsequently, the output may be obtained after one cycle each for each of the rounds, as represented by reference numerals 450 and 460. Thus, for n division operations between 2*n integer values, only n+4 cycles are required.

Figure 6:
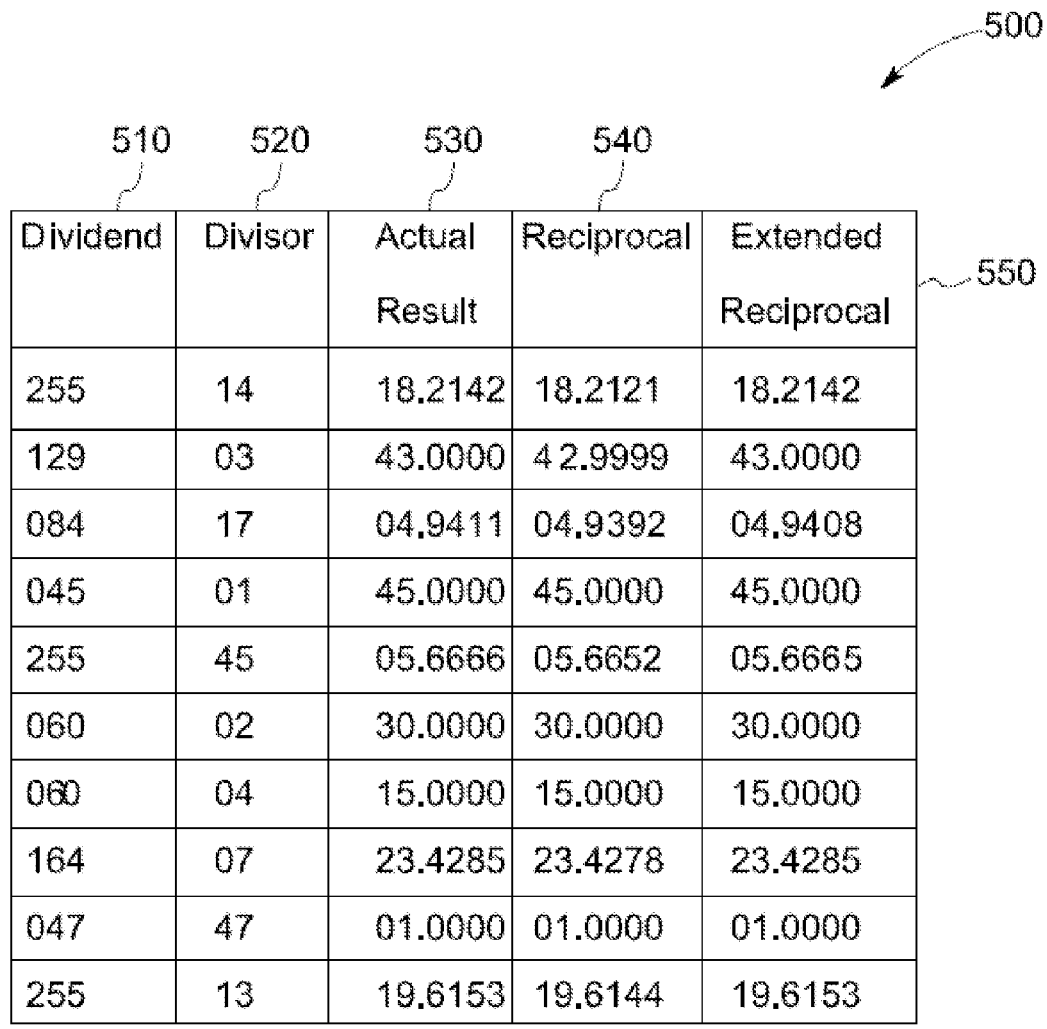
FIG. 6 illustrates example results from the system of FIG. 3 for a plurality of dividend and divisor values.

In one example embodiment, the design described above is implemented using VHDL and is synthesized for a Xilinx Vertex 2P 2vp2fg456-7 field-programmable gate array (FPGA) with simulation on the Model Sim 6.2c from Mentor Graphics Corporation. Example results from the system for a plurality of dividend and divisor values are shown in table 500 of FIG. 6.

As illustrated, the dividend and divisor values are represented by reference numerals 510 and 520 respectively. Further, the actual result for the quotient values by dividing the dividend value by the divisor value are represented by reference numeral 530. The result for the quotient values obtained by existing division method such as through reciprocal method are represented by reference numeral 540 and the result for the quotient values obtained by the method described above are represented by reference numeral 550. As can be seen, the results 550 obtained through the method described above are substantially similar to the actual result 530 and is relatively accurate as compared to the results obtained through the reciprocal method.

Furthermore, the system can be operated at a maximum frequency of about 214.087 MHz. Thus, about 1000 division operations may be performed in about 4.689 ms. Thus, the system described above provides substantially accurate results with reduced latency time.

The example methods and systems described above enable accurate estimation of a quotient value from a divisor value and a dividend value. The methods and systems discussed herein utilize an efficient, reliable, and cost-effective technique for performing division operation while reducing a latency time of such operations. The technique described above can be utilized for a variety of applications such as linear interpolation and linear approximation that require division of two signed or unsigned operands.

FIG. 7 is a block diagram illustrating an example computing device 600 that is arranged for determining a quotient value from a dividend value and a divisor value in accordance with the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a division algorithm 626 that is arranged to perform the functions as described herein including those described with respect to process 100 of FIG. 1. Program data 624 may include intermediate remainder values 628 that may be useful for determining the quotient values as is described herein. In some embodiments, application 622 may be arranged to operate with program data 624 on operating system 620 such that determination of the quotient values based upon the intermediate remainder value may be performed. This described basic configuration 602 is illustrated in FIG. 7 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to determine a quotient value by a digital processing circuit, comprising:
computing a reciprocal value of a divisor value;
multiplying the reciprocal value by a dividend value that includes a first pixel intensity value of a first pixel in an image to obtain a reciprocal product, the reciprocal product having an integer part and the divisor value including a second pixel intensity value of a second pixel in the image;
computing an intermediate remainder value by computing a product of the integer part and the divisor value, and subtracting a resulting product from the dividend value; and
determining a quotient value, based upon the intermediate remainder value, including performing binary division of the first pixel intensity value and the second pixel intensity value.

2. The method of claim 1, wherein in response to the intermediate remainder value is equal to the divisor value, setting the quotient value to a sum of the integer part and unity.

3. The method of claim 1, wherein in response to the intermediate remainder value is zero, setting the quotient value to the dividend value.

4. The method of claim 1, wherein in response to the intermediate remainder value is not equal to the divisor value or to zero, determining the quotient value by computing a product of the intermediate remainder and the reciprocal value, and adding the computed product of the intermediate remainder and the reciprocal value to the integer part.

5. The method of claim 1, further comprising:
computing reciprocal values for a plurality of possible divisor values; and
storing the computed reciprocal values in a look up table, wherein the stored computed reciprocal values are accessed from the look up table during the multiplying and the determining.

6. The method of claim 1, wherein the determining the quotient value further includes applying a five-stage pipeline architecture to determine the quotient value from the dividend value and the divisor value.

7. The method of claim 6, wherein a latency time of performing n division operations between 2*n integer values is about n+4 clock cycles.

8. A method to determine a quotient value Q by a digital processing circuit, comprising:
computing a reciprocal value $1/d$ of a divisor value d;
multiplying the reciprocal value $1/d$ by a dividend value D to obtain a reciprocal product RP of a form X.YYY, wherein X is an integer part of the reciprocal product RP;
computing an intermediate remainder value R in accordance with a relationship: $R=D-(X*d)$,
wherein the dividend value D is a first pixel intensity value of a first pixel in an image, and the divisor value d is a second pixel intensity value of a second pixel in the image; and
in response to the intermediate remainder value R is not equal to the divisor value d or to zero, computing a quotient value Q, in accordance with a relationship: $Q=X+(R*1/d)$, including performing binary division of the first pixel intensity value and the second pixel intensity value.

9. The method of claim 8, further comprising:
computing reciprocal values $1/d$ for a plurality of possible divisor values d; and
storing the computed reciprocal values $1/d$ in a look up table,
wherein the stored computed reciprocal values are accessed from the look up table during at least the multiplying.

10. The method of claim 8, wherein the computing the quotient value further includes reducing a latency time by applying a staged architecture to determine the quotient value.

11. A system to determine a quotient value Q, comprising:
a memory circuit configured to store a quotient value Q, a dividend value D that is a first pixel intensity value of a first pixel in an image, and a divisor value d that is a second pixel intensity value of a second pixel in the image; and
a processing circuitry configured to:
estimate a reciprocal product RP by multiplication of the dividend value D and a reciprocal value 1/d;
compute an intermediate remainder value R by computation of a product of an integer part X of the reciprocal product RP and the divisor value d, and by subtraction of the computed product from the dividend value D; and
determine a quotient value Q, based upon the intermediate remainder value R, including performance of a binary division of the first pixel intensity value and the second pixel intensity value.

12. The system of claim 11, wherein the processing circuitry includes a look up table configured to receive a 8-bit divisor valued and to provide a 16-bit reciprocal value 1/d by access of a plurality of reciprocal values 1/d stored for a plurality of possible divisor values d.

13. The system of claim 12, wherein the processing circuitry further includes at least one 8-bit register and one 16-bit register configured to propagate an input dividend value D and the reciprocal value 1/d to an output in a particular clock cycle time.

14. The system of claim 13, wherein the processing circuitry further includes a first multiplier block configured to multiply the dividend value D and the reciprocal value 1/d from the output of the 8-bit and 16-bit registers to estimate the reciprocal product RP.

15. The system of claim 14, wherein the processing circuitry further includes a computational block configured to estimate the intermediate remainder value R and a second multiplier block to determine the quotient value Q based upon the intermediate remainder value R.

16. The system of claim 15, wherein the processing circuitry further includes a global clock configured to control an operation of the look up table, the 8-bit and 16-bit registers, the computational block and the first and second multiplier blocks.

17. The system of claim 16, wherein each of the look up table, the 8-bit and 16-bit registers, the computational block and the first and second multiplier blocks has a latency of about one clock cycle.

18. The system of claim 11, wherein in response to the intermediate remainder value R being equal to the divisor d value, the processing circuitry is further configured to set the quotient value Q to a sum of the integer part X and unity and wherein in response to the intermediate remainder value is zero, the processing circuitry is further configured to set the quotient value Q to the dividend value D.

19. The system of claim 11, wherein in response to the intermediate remainder value R being not equal to the divisor value d or to zero, the processing circuitry is further configured to determine the quotient value Q by computation of a product of the intermediate remainder RP and the reciprocal value 1/d, and by addition of the computed product of the intermediate remainder RP and the reciprocal value 1/d to the integer part X.

20. The system of claim 15, wherein the system is a component of one of an image processing circuit, a signal processing circuit, a field-programmable gate array (FPGA), and a linear interpolation circuit.

21. The method of claim 1, further comprising:
based on the quotient value, filtering the image to select pixels having a particular quotient value.

22. The method of claim 1, further comprising:
based on the quotient value, filtering the image to select pixels having respective pixel intensity values above a threshold value.

23. The method of claim 8, further comprising:
based on the quotient value Q, filtering the image to select pixels having a particular quotient value Q.

24. The method of claim 8, further comprising:
based on the quotient value Q, filtering the image to select pixels having respective pixel intensity values above a threshold value.

25. The system of claim 11, wherein the processing circuitry is further configured to:
based on the quotient value Q, filter the image to select pixels having a particular quotient value Q.

26. The system of claim 11, wherein the processing circuitry is further configured to:
based on the quotient value Q, filter the image to select pixels having respective pixel intensity values above a threshold value.

* * * * *

UNITED STATES PATENT AND TRADEMARK OFFICE
CERTIFICATE OF CORRECTION

| | | |
|---|---|---|
| PATENT NO. | : 8,694,573 B2 | Page 1 of 1 |
| APPLICATION NO. | : 12/647255 | |
| DATED | : April 8, 2014 | |
| INVENTOR(S) | : Bhattacharjee et al. | |

It is certified that error appears in the above-identified patent and that said Letters Patent is hereby corrected as shown below:

In the Claims:

In Column 9, Line 67, in Claim 1, delete "in an" and insert -- in the --, therefor.

In Column 11, Line 25, in Claim 12, delete "valued" and insert -- value d --, therefor.

Signed and Sealed this
Ninth Day of September, 2014

Michelle K. Lee
*Deputy Director of the United States Patent and Trademark Office*